May 19, 1959     J. G. VAN OOT     2,887,462
POLYESTER OR POLYAMIDE-MANGANOUS SALT
COMPOSITION AND PROCESS
OF PREPARING SAME
Filed Jan. 26, 1955
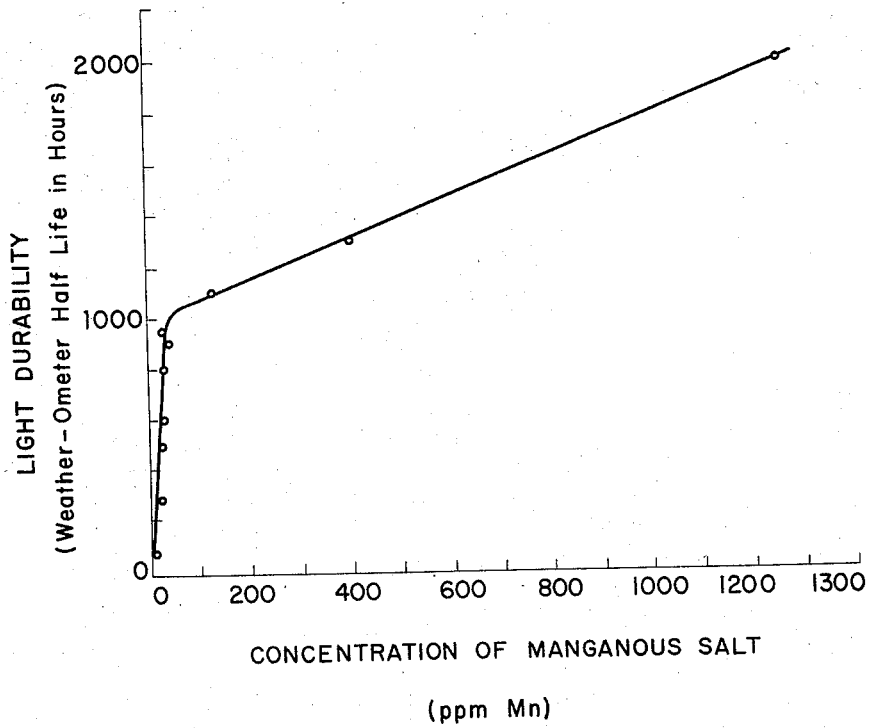
INVENTOR
JAMES G. VAN OOT
BY *Charles A. McClure*
ATTORNEY United States Patent Office 2,887,462
Patented May 19, 1959

2,887,462
POLYESTER OR POLYAMIDE-MANGANOUS SALT COMPOSITION AND PROCESS OF PREPARING SAME

James G. Van Oot, Wilmington, Del., assignor to E. I. du Pont de Nemours and Company, Wilmington, Del., a corporation of Delaware Application January 26, 1955, Serial No. 484,271

15 Claims. (Cl. 260—40)

This invention relates to treatment of synthetic linear condensation polymers and especially to provision of color-free, delustered, light-durable products thereof, such as textile components.

In durability upon exposure to light, unpigmented yarns made from synthetic linear condensation polymers approach cotten and linen and are better than viscose rayon and cellulose acetate and considerably superior to silk. Pigmentation and, to a lesser extent, other treatments to reduce luster of textile materials are customary, being conducive to consumer acceptance of many kinds of articles made therefrom; however, amounts of conventional pigments sufficient to bring about adequate delustering of the materials to which they are added also have undesirable effects, such as imparting a color thereto or reducing the light-durability thereof. Prominent among delustering pigments is titanium dioxide, which is accepted as superior to other inert metallic oxides and salts otherwise suitable (as being incompatible with the subject textile material and differing markedly therefrom in refractive index). Titanium dioxide or other delustering pigment is applied in finely divided form to the subject material at any of several stages in the usual manufacturing operations.

A primary object of the present invention is provision of light-durable synthetic linear condensation polymers and products thereof. Another object is provision of delustered textile materials without imparting color thereto or significantly impairing the light-durability thereof. Other objects will be apparent from the following description and the accompanying drawing, which shows graphically the relationship between the light-durability of yarns made of a synthetic linear condensation polymer and the concentration of additive of this invention for that purpose therein.

In general, the objects of the present invention are accomplished by treating synthetic linear condensation polymers to incorporate therein small quantities of manganous compounds containing reducing anions. For the purposes of this invention a "reducing anion" has a standard electrode potential (referred to the hydrogen electrode at 25° C.) exceeding 0.1 $n$ volt, where $n$ is the number of electrons liberated by oxidation of the anion. The concentration of manganous compounds acceptable as "small quantities" for the purposes of this invention falls within the range from about $10^{-4}$ to $10^{-5}$ part of manganese per part of treated material, being substantially independent of the polymer composition. This treatment is compatible with conventional delustering pigmentation and may be coincident therewith or separate therefrom.

In all but the last of the examples of this invention appearing below, polyhexamethylene adipamide prepared as described by Spanagel in Patent 2,163,636 was converted to flake form as taught by Graves in Patent 2,289,774, delustered (as described in each particular example) by the addition procedure of Hoff given in Patent 2,278,878, extruded by means of the Greenewalt apparatus of Patent 2,217,743, and drawn in resulting filament form according to the teaching of Babcock in Patent 2,289,232. This nylon, which represents polyamides generally, was chosen for the examples because of its recognized commercial importance. Unless otherwise noted in the examples, parts and percentages are expressed by weight.

EXAMPLE I

An amount of 7.8 grams of manganous oxalate, $Mn(C_2O_4) \cdot 2H_2O$, is added to an evaporator containing 405 lbs. of 48% nylon salt solution and 377 grams of 25% aqueous acetic acid. Nylon polymer is made therefrom in conventional manner, 17.5 lbs. of 20% titanium dioxide being added in aqueous slurry during the autoclave cycle. The resulting polymer is extruded conventionally to give continuous filaments whose manganese content is 26 parts per million (p.p.m.). This yarn is drawn to 3.27 times its extruded length (3.27×). Visual observation of the yarn reveals it to be opaquely white or free from color; exposure of it in the Weather-Ometer determines its half-life (time in which the tenacity of the yarn so treated falls to one-half the original value) to be about 700 hours.

A control yarn, containing 2% $TiO_2$, but no manganous oxalate, prepared in like fashion and treated similarly to that just described was equally white but exhibited a half-life of only 75 hours. Yarn similarly prepared but having only 10 p.p.m. manganous oxalate (expressed as manganese) was intermediate between the yarn of the example and the control yarn in light-durability, having a half-life of 220 hours (only slightly above the minimum for commercial acceptability). Yarn prepared in like manner to contain 0.02% titanium dioxide and an amount of manganous oxalate equivalent to 36 p.p.m. manganese exhibited a half-life of 1600 hours, as compared to 650 hours for a yarn having the same concentration of titanium oxide but lacking the manganous salt; this is a bright yarn made according to Spanagel (Patent 2,385,890).

Yarn made like that of Example I except that 6.08 grams of manganous sulfate, $MnSO_4 \cdot H_2O$, was employed instead of the oxalate analyzed 22 p.p.m. manganese; this yarn had a pale greyish-tan cast (color incompatible with commercial quality) and a half-life of 450 hours. Use of 8.7 grams of manganous acetate, $Mn(O_2CCH_3)_2 \cdot 4H_2O$, according to the procedure of Example I provided a yarn with 21 p.p.m. of manganous salt (expressed as manganese) and a half-life of 800 hours but a pale greyish-tan color.

The instrument (Weather-Ometer) employed here to determine durability of yarn upon exposure to light is a well-known device for measuring the effect of radiation upon a sample under conditions calculated to provide accelerated aging. In the procedure here employed a single layer of yarn was wound on a test panel with individual strands being separated from one another for uniformity of exposure and convenience in removal. Each sample was mounted upon a drum rotating once each minute at a distance of 15 inches from a carbon arc surrounded by a glass envelope. Temperature of approximately 110° F. and relative humidity of about 90% were maintained within the surrounding housing, but the aqueous spray of the usual indoor weathering test was omitted. Operation was continuous except for interruption every 20 to 25 hours to permit changing of the carbons and washing of the glass envelope and removal of the panel every 50 to 100 hours for stress-strain testing of a portion of the exposed yarn.

EXAMPLE II

An amount of 0.336 gram of manganous hypophosphite, $Mn(H_2PO_2) \cdot H_2O$, is added to the evaporator, which contains 5480 grams of 48% nylon salt solution and 10.7 grams of 25% aqueous acetic acid. Nylon polymer is made therefrom in the usual fashion, with addition of 250 grams of 20% titanium dioxide slurry during the autoclave cycle. Extruded into continuous filaments and drawn 4.05×, the product contains 32 p.p.m. of manganous hypophosphite (expressed as manganese) and has a half-life of 700 hours and an appearance like that of the product of Example I.

Use of 0.51 gram of manganous hypophosphite in the procedure of Example II gave a yarn containing 60 p.p.m. of manganous salt (as manganese); in appearance this yarn was very slightly off-white, and its half-life was 900 hours. Increase of the concentration to 120 p.p.m. through use of 1.008 grams of this salt in the procedure of Example II gave a yarn having a half-life of 1000 hours and a noncommercial pale grey color.

The following table summarizes the effect of representative anions in manganous compounds, at the stated concentrations, upon color of polyhexamethylene adipamide yarn prepared as described above. Only the white and slightly off-white yarns are acceptable for most textile purposes.

Table

| Manganous Salt | | Yarn Color (By visual observation) |
|---|---|---|
| Anion | Concentration (p.p.m. Mn) | |
| Hydroxide | 22 | pale pink grey. |
| Sulfate | 25 | very pale greyish-tan. |
| Acetate | 25 | Do. |
| Lactate | 25 | very pale greyish-blue. |
| Oxalate | 30, 40 | white, slightly off-white. |
| Hypophosphite | 40, 80, 120 | white, slightly off-white, pale grey. |

The above table shows at the top the effect of four manganous compounds, containing anions not comprehended by the definition of reducing anions, in endowing yarn with color, instead of producing simply an opaque or white appearance. Furthermore, the last entry in the table shows the production of noncommercial color in yarn containing excessive concentration of a manganous salt, having an otherwise acceptable (reducing) anion.

EXAMPLE III

A flask is charged with 50 grams of dimethyl terephthalate, 50 grams of ethylene glycol, 0.009 mole percent lead oxide catalyst (based upon the dimethyl terephthalate), and an amount of manganous sulfite, $MnSO_3$, equivalent to 40 p.p.m. manganese. The flask is fitted with a condenser and heated at atmospheric pressure, whereupon evolution of methanol begins in the range of 185 to 210° C. Heating is continued at a rate to maintain ebullition until no further methanol is evolved, the final pot temperature being about 220° C. The resulting mixture is introduced into a polymerization tube and heated at 275° C. under reduced pressure of 0.5 to 1.0 millimeter of mercury for two hours, in which time polymerization is complete. The resulting polymer is extruded into yarn and drawn in conventional manner. Light-durability of this yarn, as measured by the Weather-Ometer, is markedly more than that of yarn made in like manner without content of manganous sulfite. The results obtained with the particular polyester utilized here are typical of the practice of this invention upon fiber-forming polyesters generally.

As revealed by conventional physical testing of tenacity, elongation, and elastic modulus, yarns having content of manganous salt according to this invention are in those critical respects at least the equal of control yarns lacking this salt content.

The effects obtained according to this invention are substantially independent of the composition of the subject synthetic linear condensation polymer, similar results being obtained with polycaproamide and polyesteramides and polyurethanes generally, as well as independent of the procedure by which the manganous compound is incorporated therein. Suitable methods of imparting the desired content of manganous salt to the subject material include (1) addition to unpolymerized reaction mixture, (2) addition admixed with or coated on pigment to be slurried with the polymer, and (3) impregnation of textile material; of these, the first usually is the easiest to accomplish, being preferable to the second in this regard, and the last is least effective, being somewhat less permanent.

Other manganous compounds than those mentioned above also meet the requirements of this invention; among them are the sulfide and the selenide, as now is suggested by their respective standard potentials. Similarly, many compounds of manganese are inoperable, including acetate, formate, lactate, stearate, hydroxide, salicylate, tartrate, thiocyanate, nitrate, sulfate, chlorate, iodate, and the halides, to mention but a few.

To be effective according to the present invention in a synthetic linear condensation polymer, which may be in the form of yarn or other textile material, a suitable manganous compound should be present to a concentration of at least ten parts per million (manganese) based upon the weight of the material containing it. This is graphically apparent from the drawing that forms a part hereof, having two rectilinear coordinates: the abscissa being entitled, "Concentration of Manganous Salt (p.p.m. Mn)", and the ordinate "Light-Durability (Weather-Ometer half-life in hours)." This relationship for conventional nylon yarn appears as a monofunctional curve having at the lower left a constant steep slope from near the origin to about 950 hours and 80 p.p.m., a smooth curve of progressively less rapidly increasing slope from that point to about 1050 hours and 100 p.p.m., and from this point another straight portion having a relatively slight positive slope. The "knee" defined by the mentioned points sets an upper limit on concentration, the lower limit being set by the noticeable improvement in light-durability at and above about 10 p.p.m. by small increments in concentration; at the upper limit the advantage of the indicated incremental improvement in light-durability begins to be offset by the perceptible coloration accompanying additional concentration increments. However, if the resulting slight color is acceptable in a particular product, operation in a range somewhat above the top of the knee will be quite beneficial. The table presented already highlights the effects obtained with two suitable manganous salts, the data for the hypophosphite representing three rather widely separated points on the illustrated curve. Substitution of other manganous compounds comprehended by this invention or of other synthetic linear condensation polymers in the materials treated therewith varies this graphical relationship only inappreciably.

What is claimed is:

1. Composition comprising substantially color-free fiber-forming synthetic linear condensation polymer selected from the group consisting of polyamides and polyesters containing between about 10 and about 400 parts per million of manganese in the form of a manganous compound having a reducing anion with a standard hydrogen electrode potential in excess of 0.1 $n$ volt, where $n$ is the number of electrons liberated upon oxidation of the anion.

2. Composition comprising substantially color-free fiber-forming synthetic linear condensation polymer selected from the group consisting of polyamides and polyesters containing between about 10 and about 400 parts per million of manganese in the form of a manganous compound selected from the group consisting of manganous oxalate, manganous hypophosphite, manganous sulfite, manganous sulfide, and manganous selenide.

3. Composition comprising essentially color-free fiber-forming synthetic linear condensation polymer selected from the group consisting of polyamides and polyesters containing between about 10 and about 100 parts per million of manganese in the form of a manganous compound selected from the group consisting of manganous oxalate, manganous hypophosphite, manganous sulfite, manganous sulfide, and manganous selenide.

4. The composition of claim 3 in filamentary form.

5. A composition comprising essentially a color-free fiber-forming synthetic linear condensation polymer selected from the group consisting of polyamides and polyesters containing between about 10 and about 100 parts of manganese in the form of manganous oxalate per million parts of polymer.

6. A composition comprising essentially a color-free fiber-forming synthetic linear condensation polymer selected from the group consisting of polyamides and polyesters containing between about 10 and about 100 parts of manganese in the form of manganous hypophosphite per million parts of polymer.

7. A composition comprising essentially a color-free fiber-forming synthetic linear condensation polymer selected from the group consisting of polyamides and polyesters containing between about 10 and about 100 parts of manganese in the form of manganous sulfite per million parts of polymer.

8. A composition comprising essentially a color-free fiber-forming synthetic linear condensation polymer selected from the group consisting of polyamides and polyesters containing between about 10 and about 100 parts of manganese in the form of manganous sulfide per million parts of polymer.

9. A composition comprising essentially a color-free fiber-forming synthetic linear condensation polymer selected from the group consisting of polyamides and polyesters containing between about 10 and about 100 parts of manganese in the form of manganous selenide per million parts of polymer.

10. Textile strand comprising a fiber-forming synthetic linear condensation polymer selected from the group consisting of polyamides and polyesters delustered to visual whiteness and containing 20 to 80 parts per million of manganese in the form of a manganous salt selected from the group consisting of manganous oxalate, manganous hypophosphite, manganous sulfite, manganous sulfide, and manganous selenide.

11. Process of treating fiber-forming synthetic linear condensation polymer to enhance the light-durability thereof comprising incorporating into a fiber-forming synthetic linear condensation polymer selected from the group consisting of polyamides and polyesters between about 10 and about 400 parts per million of manganese in the form of a manganous compound selected from the group consisting of manganous oxalate, manganous hypophosphite, manganous sulfite, manganous sulfide, and manganous selenide.

12. The process of claim 11 in which the polymer has incorporated in it a small amount of titanium dioxide.

13. The process of claim 11 in which the manganous compound is incorporated into the polymer by admixing with the monomers reacted to form the polymer prior to polymerization of said monomers.

14. Process of preparing a fiber-forming synthetic linear condensation polymer selected from the group consisting of polyamides and polyesters to enhance the light-durability and to preserve a satisfactory color-free delustered appearance thereof comprising incorporating into said fiber-forming synthetic linear condensation polymer between about 10 and about 100 parts per million of manganese in the form of a manganous compound selected from the group consisting of manganous oxalate, manganous hypophosphite, manganous sulfite, manganous sulfide, and manganous selenide.

15. The process of claim 14 in which the manganous compound is incorporated into the polymer by admixing with the monomers reacted to form the polymer prior to polymerization of said monomers.

References Cited in the file of this patent

UNITED STATES PATENTS

| | | |
|---|---|---|
| 2,578,660 | Auspos et al. | Dec. 18, 1951 |

FOREIGN PATENTS

| | | |
|---|---|---|
| 689,629 | Great Britain | Apr. 1, 1953 |
| 955,259 | France | Jan. 9, 1950 |